United States Patent [19]

Sendelweck

[11] Patent Number: 5,032,900
[45] Date of Patent: Jul. 16, 1991

[54] TELEVISION RECEIVER WITH AUXILIARY INPUT CONNECTOR FOR VIDEO SIGNALS OF A SEPARATED Y-C FORMAT

[75] Inventor: Gene K. Sendelweck, Indianapolis, Ind.

[73] Assignee: Thomson Consumer Electronics, Inc., Indianapolis, Ind.

[21] Appl. No.: 517,658

[22] Filed: Apr. 30, 1990

[51] Int. Cl.$^5$ .............................................. H04N 9/78
[52] U.S. Cl. ..................................... 358/21 R; 358/31
[58] Field of Search ................................ 358/21 R, 31

[56] References Cited

U.S. PATENT DOCUMENTS

| | | | |
|---|---|---|---|
| 4,802,000 | 1/1989 | Willis | 358/31 |
| 4,935,807 | 6/1990 | Sendelweck | 358/21 R |

FOREIGN PATENT DOCUMENTS 2134743 8/1984 United Kingdom .

*Primary Examiner*—James J. Groody
*Assistant Examiner*—Kim Yen Vu
*Attorney, Agent, or Firm*—Joseph S. Tripoli; Peter M. Emanuel; Richard G. Coalter

[57] ABSTRACT

A color television receiver includes a comb filter having luminance and chrominance outputs coupled to respective inputs of a display processor. A signal source provides composite and non-composite color video signals for display. A switching circuit having a first operating mode for coupling the composite video signal to an input of the comb filter for enabling display thereof by said display processor. The switching circuit has a second operating mode for coupling the luminance component of the non-composite video signal to the input of the comb filter and for concurrently coupling the chrominance component of the non-composite video signal to the chrominance output of the comb filter for facilitating display of the non-composite video signal by said display processor.

4 Claims, 3 Drawing Sheets

TELEVISION RECEIVER WITH AUXILIARY INPUT CONNECTOR FOR VIDEO SIGNALS OF A SEPARATED Y-C FORMAT

FIELD OF THE INVENTION

This invention relates to television receivers and particularly to receivers intended for use with auxiliary video input signals of a non-composite type having separate luminance and chrominance components.

BACKGROUND OF THE INVENTION

Video cassette recorders (VCR's) and combination camera-recorders (cam-corders) have been proposed that provide a relatively wideband luminance signal response (e.g., 5 MHz) and which include an output connector (commonly called an "S-terminal") that provides separated luminance and chrominance output signals. This new video interconnection standard is commonly known as the "SVHS" video format which stands for "super VHS". An advantage of this new (non-composite) video inter-connection format is that one may apply the separated luminance and chrominance signal to the display processing circuits of a television receiver directly without going through the receiver's internal luminance-chrominance signal separation filter (e.g., a comb filter). Advantageously, the SVHS video signal format eliminates interference effects such as cross-color and cross-luminance which otherwise could occur if the luminance and chrominance signals were to be combined as a composite video signal for application to the receiver.

Television receivers suitable for processing and displaying video signals of either composite form or of a separated luminance-chrominance signal format are known. An example is shown and described in UK Patent Application GB 2, 134, 743 A of Tanaka published Aug. 15, 1984 and entitled COLOR DISPLAY SYSTEM. In this system video input signals of composite type are applied to a comb filter for separation into comb-filtered luminance and chrominance components which are applied by means of respective switches to corresponding luminance and chrominance input of a display processing unit. The system includes a pair of input terminals for receiving respective ones of the luminance and chrominance components of a non-composite video input signal. For displaying signals of this format the switches are changed over to disconnect the comb filter from the display processor and connect the input terminals of the non-composite signal source to respective ones of the luminance and chrominance input terminals of the display processor.

Another example of a color television receiver having provisions for displaying signal of both composite and non-composite format is the "RCA" brand receiver employing the chassis type number CTC-159 manufactured and sold by Thomson Consumer Electronics, Inc., of Indianapolis, Ind. In this receiver the comb filter includes emitter follower output stages for applying the comb filtered luminance and chrominance signal to the display processor. The luminance and chrominance components of the non-composite (S-VHS) input signal are applied to respective output of the comb filter by means of respective switched amplifiers. The amplifiers are switched OFF to enable display of a composite video signal applied to the input of the comb filter. To display the S-VHS signal the amplifiers are switched ON thereby reverse biasing the emitter follower output transistors of the comb filter and coupling the amplified luminance and chrominance component of the S-VHS input signal to respective inputs of the display processor. Advantageously, this technique of selecting signals for display provides amplification as well as switching as compared with the system of Tanaka described above which only provides switching of the composite and non-composite signals. A further feature of this receiver is that a multi-pole input switch is provided for selecting one of a plurality of composite video input signals for application to the input of the comb filter and this switch is coupled to the comb filter by means of an amplifier whereby each composite video signal that is selected for display is subjected to amplification by the amplifier preceding g the comb filter and the S-VHS luminance and chrominance components are separately amplified by respective ones of the two switched amplifiers connected to the comb filter output terminals.

SUMMARY OF THE INVENTION

A color television receiver embodying the invention includes a comb filter having luminance and chrominance outputs coupled to respective inputs of a display processor and having a signal source for providing a composite video input signal having combined luminance and chrominance components and providing a non-composite video input signal having separated luminance and chrominance components. Circuit means are provided having a first operating mode for coupling the composite video signal to an input of said comb filter for enabling display of said composite video input signal by said display processor and having a second operating mode for coupling said luminance component of said non-composite video input signal to said input of said comb filter and for concurrently coupling said chrominance component of said non-composite video input signal to said chrominance output of said comb filter for displaying said non-composite video input signal by said display means.

BRIEF DESCRIPTION OF THE DRAWING

The invention is illustrated in the accompanying drawing wherein like elements are denoted by like reference designators and in which.

DETAILED DESCRIPTION

Figure 1:
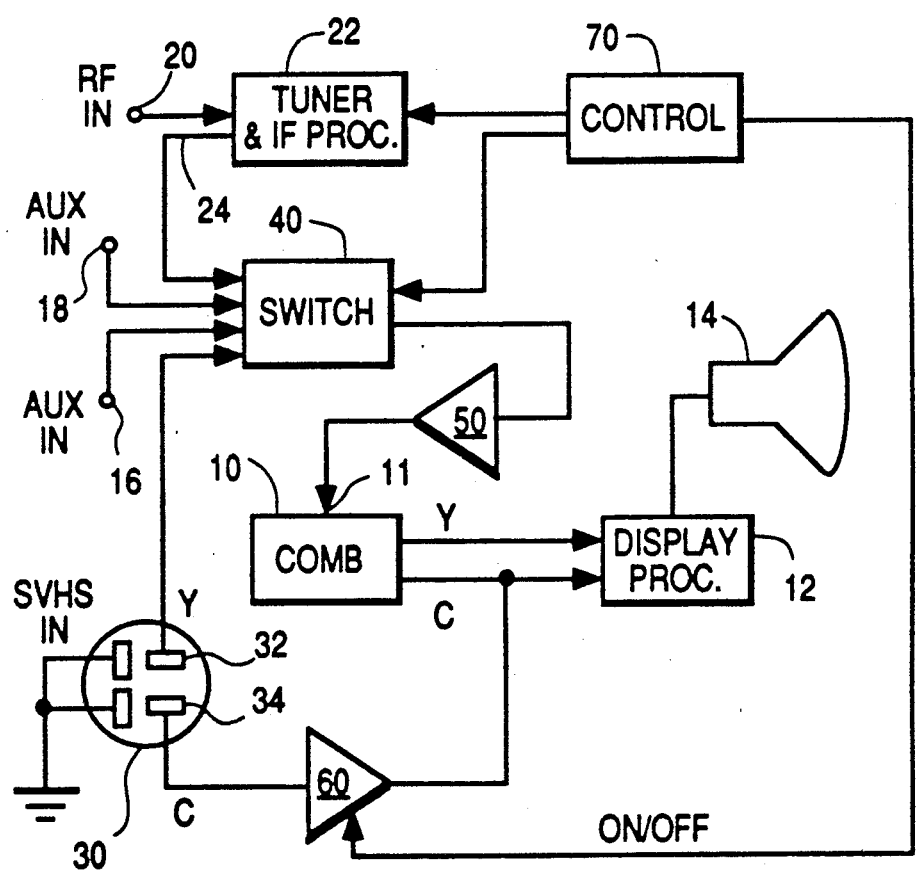
FIG. 1 is a block diagram of a color television receiver embodying the invention.

The color television receiver of FIG. 1 includes a comb filter 10 having luminance (Y) and chrominance (C) outputs coupled to respective inputs of a display processor 12 having an output coupled to a display device (e.g., a kinescope) 14 for displaying signals applied to the display processor 12. The receiver includes a signal source for providing a composite video input signal having combined luminance and chrominance components and for providing a non-composite video input signal having separated luminance and chrominance components. The signal source comprises auxiliary input terminals 16 and 18 for receiving baseband composite video input signals from a VCR or other suitable source and a tuner 22 having an antenna input 20 for receiving an RF modulated television signal and an output 24 providing a baseband composite video signal. The signal source also includes an S-VHS connector 30 for providing a non-composite video input signal of a format having separated luminance and chrominance components provided at respective terminals 32 and 34 of S-VHS connector 30.

The color television receiver of FIG. 1 further includes circuit means for facilitating the display of input signals of composite and non-composite format. The circuit means includes an input switch 40 having inputs connected to apply the baseband composite video output signal of 22, the auxiliary baseband composite video signals provided by terminals 16 and 18 and the luminance component of the S-VHS signal provided by terminal 32 to the input 11 of comb filter 10 via a switched amplifier 50. The circuit means also includes a switched amplifier 60 for coupling the chrominance component of the S-VHS video signal (non-compotite) provided at terminal 34 to the chrominance output (C) of comb filter 10. A control unit 70 supplies control signals to tuner 22 for controlling channel selection, to switch 40 for controlling selection of input signals to the comb filter 10 and to the switched amplifier 60 for controlling coupling of the chrominance component of the S-VHS signal to the output of comb filter 10.

In operation, when standard broadcast or cable TV channel signals are to be displayed, control unit 70 sends a disabling signal to switched amplifier 60, a channel selection signal to tuner 22 and a control signal to switch 40 for conditioning the switch 40 to apply a selected composite video input signal to terminal 11 of comb filter 10 corresponding to the broadcast or cable channel received. Comb filter 10 separates the luminance and chrominance components of the tuner selected composite video signal and applies them to the inputs of processor 12 for display by display unit. The same operation takes place when selecting either of the auxiliary composite video input signals AUX-1 or AUX-2.

When the non-composite video input signal provided by S-VHS input connector 30 is to be displayed the processing changes. Specifically, control unit 70 sends a control signal to video input switch 40 for causing switch 40 to apply the luminance component of the S-VHS signal to the input 11 of comb filter 10 via amplifier 50. Concurrently, control unit 70 enables switched amplifier 60 to coupled the chrominance component of the S-VHS signal (at terminal 34) to the chrominance output of comb filter 10. The comb filter 10 is preferably of a type having an emitter follower output stage and when the chrominance signal is applied thereto be switched amplifier 60 the output transistor of the emitter follower is thereby reverse biased. Although it is preferred that comb filter have an emitter follower output, this is not essential to the invention because the signal applied to the comb filter in this mode does not contain a chrominance component and therefore it is not possible for the the chrominance output of the comb filter to interfere with the chrominance signal coupled from terminal 34 of the S-VHS connector. However, when conventional composite video signals are being displayed the switched amplifier 60 ensures that the S-VHS chrominance signal (if present) does not interfere with the chrominance component of the composite video signal being processed.

The color television receiver of FIG. 1 has a number of advantageous features over the prior art receivers previously discussed. Firstly, it will be noted that even though the luminance component of the non-composite video signal is subjected to comb filtering, it never the less is never mixed with the S-VHS chroma signal and so there is no possibility of undesirable cross-color or cross-luma effects. Moreover, it will be noted that all signals are subjected to amplification by only two amplifiers (50 and 60) whereas for the known receiver three amplifiers were required. This reduction in the number of amplifiers required desirably improves the overall reliability of the color television receiver due to the reduction of parts needed to implement it and provides an obvious economic benefit as well.

Figure 2:
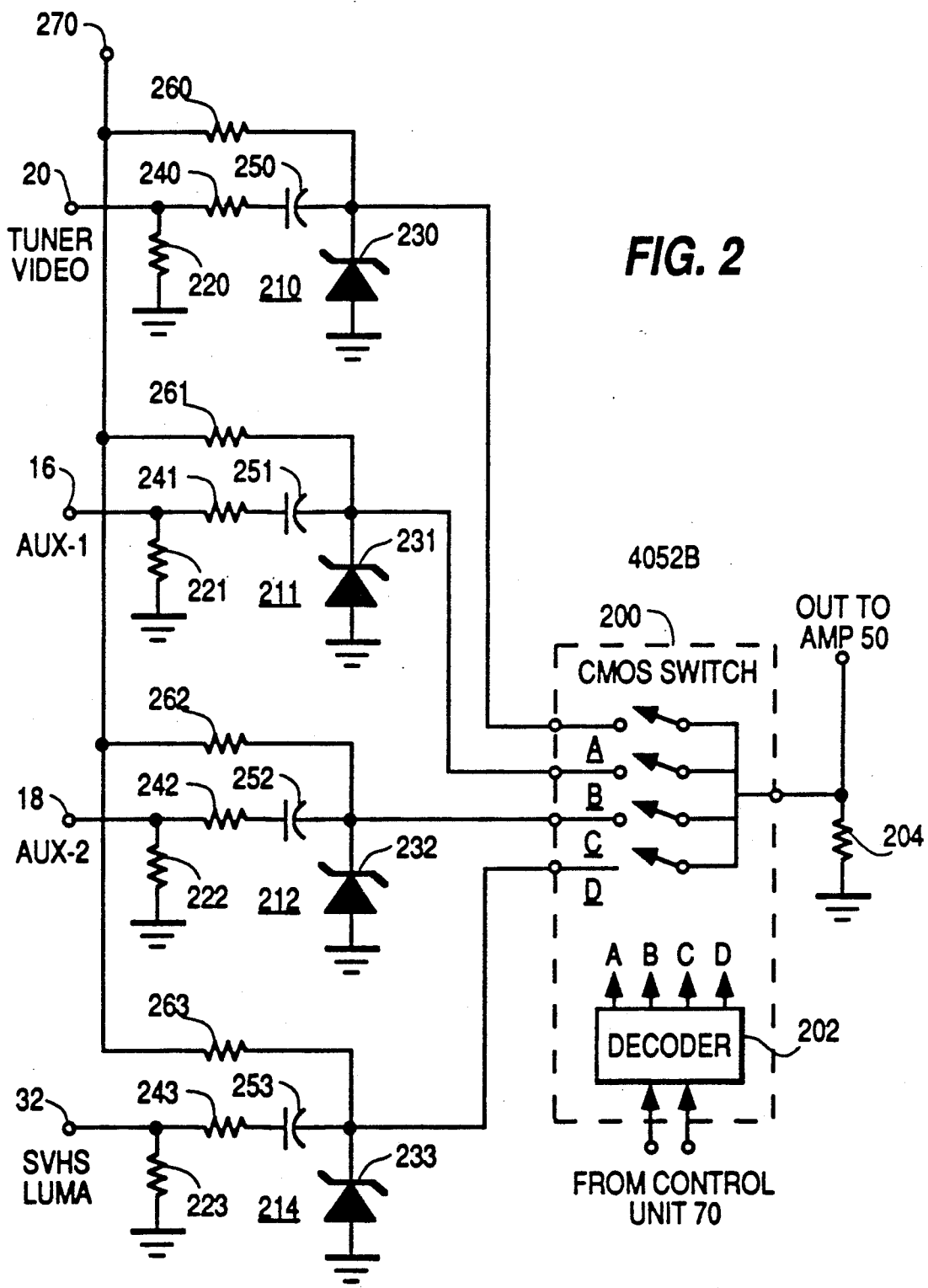
FIG. 2 is a circuit diagram, partially in block form, of an input video selection switch suitable for use in the receiver of FIG. 1.

FIG. 2 is exemplary of a presently preferred embodiment of the switch 40 of FIG. 1. Other switches, suited for operation at video frequencies may be used instead. The preferred switch is described in detail in U.S. patent application Ser. No. 441,901 filed Nov. 28, 1989 by the present inventor. The switch comprises a type CD 4052 B CMOS integrated circuit 200 which has a four position switch (A-D) and a decoder 202 for controlling the switch. The switch output is connected to a load resistor 204 to which amplifier 50 is connected and the four switch inputs of the integrated circuit 200 are coupled to terminals 20, 16, 18 and 32 via respective coupling networks 210–214. Each network includes an input terminating resistor 220–223, a Zener diode 230–234 coupled between the CMOS switch input and ground, a series connected resistor (240–243) and capacitor (250–253) coupled between the video input terminals and respective CMOS switch input terminals and a bias resistor (260–263) coupled between a supply voltage terminal 270 and respective cathodes of the Zener diodes 230–233.

In operation, decoder 202 decodes control signals provided by control unit 70 to close one of four of the switches A-D of CMOS switch 200 to thereby select one of the input signals at terminals 20, 18, 16 and 32 for application to load resistor 204 and amplifier 50. As an example, if the tuner input 20 is not selected then switch A will be open and Zener diode 230 will be forward biased by current flow from resistor 260. This condition provides attenuation of the signal at terminal 20 by both the open switch A and by the "L" type attenuator formed by resistor 240 and forward biased Zener diode 230. Conversely, when switch A is closed the bias current for Zener diode 230 is diverted to ground by means of the load resistor 204. Accordingly Zener diode 230 turns off and provides no attenuation and the switch section A couples the input signal at terminal 20 to the amplifier 50. The same operation occurs for the remaining switch sections. Other advantages of this switching arrangement are described in U.S. patent application Ser. No. 441,901 filed Nov. 28, 1989 by the present inventor.

Figure 3:
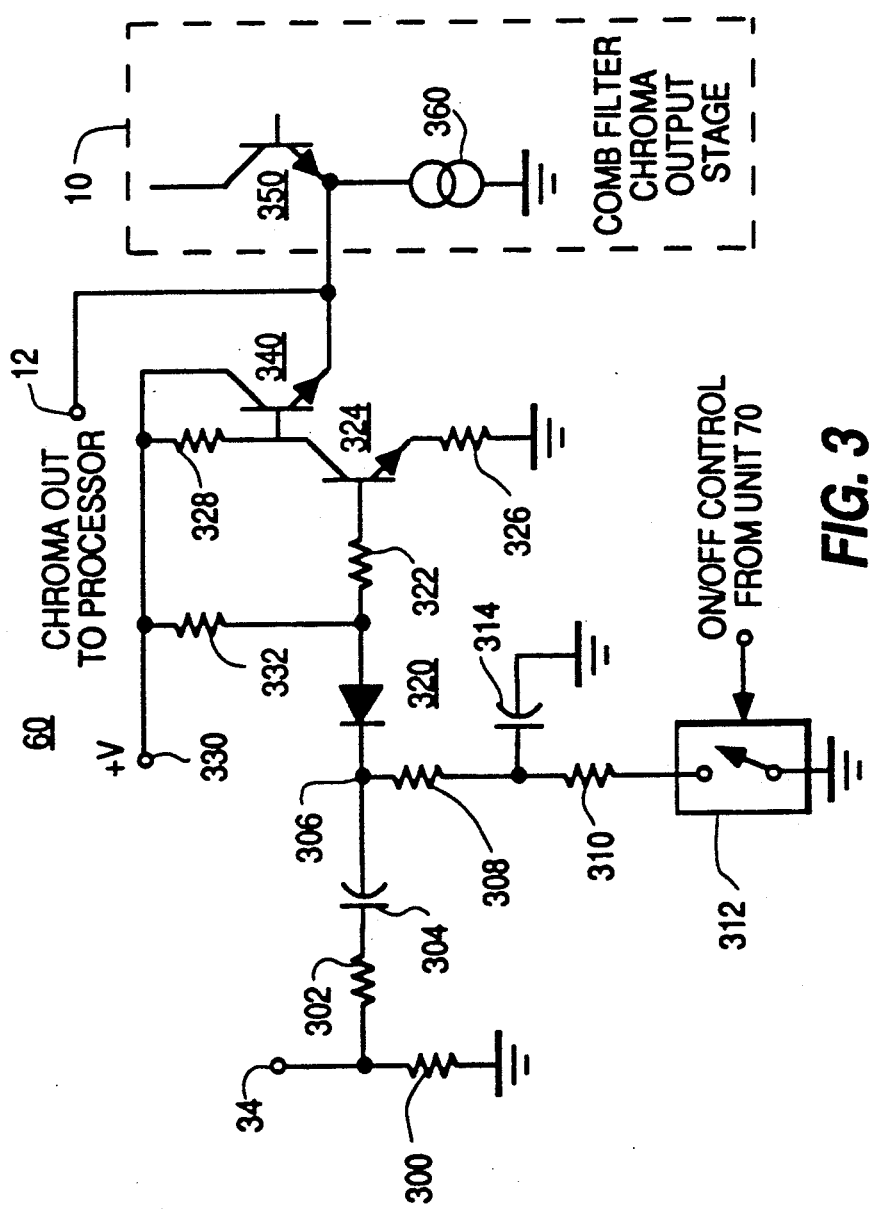
FIG. 3 is a circuit diagram of a switched amplifier suitable for use in the receiver of FIG. 1.

FIG. 3 is an example of a presently preferred switched amplifier which may be used in the example of FIG. 1. Other switched amplifiers may be used instead. In FIG. 3 the S-VHS chrominance input terminal 34 is coupled to ground by an input terminating resistor 300 and is coupled to a circuit node 306 via an electro-static discharge (ESD) protection resistor 302 in series with a DC blocking capacitor 304. Node 306 is coupled to ground via series connected resistors 308 and 310 and a switch 312 controlled by control unit 70. The common connection of resistors 308 and 310 is coupled to ground via a bypass capacitor 314 thereby forming a low pass filter which isolates noise with may be present in switch 312 from node 306 and also isolates chrominance present at node 306 from other signals which may be switched by additional switch sections in switch 312. Node 306 is further coupled via the cathode-anode path of a diode and a resistor 322 to the base of a NPN transistor having an emitter coupled to ground via an emitter resistor and having a collector coupled to a supply terminal 330 via a collector load resistor 328. The supply terminal is also coupled to the anode of Zener diode 320 via a bias resistor 332. The collector of transistor 324 is coupled to the base of an output transistor 340 having a collector connected to supply terminal 330 and an emitter connected to the output of comb filter 10. The emitter follower output stage of comb filter 10 is outlined in phantom and includes an NPN transistor 350 having an emitter coupled via a current source 360 to ground.

In operation when control unit 70 closes switch 312 a current will flow through resistors 332, 308 and 310 and diode 320 to ground thereby simultaneously forward biasing diode 320 and biasing amplifier transistor 423 for linear operation. The input signal at terminal 34 is conducted by diode 320 to amplifier transistor 324, amplified and applied by emitter follower 340 to the output terminal with transistor 340 being biased at a sufficiently positive voltage (e.g., 9 volts) to reverse bias the emitter follower 350 transistor of comb filter 10 which is biased at a lesser voltage (e.g., 6 volts). When control unit 70 opens switch 312 there is no DC path for the cathode of diode 320. Accordingly, for this condition current provided by resistor 332 saturates transistor 324 and drives the emitter follower transistor to a low potential thereby reverse biasing the base-emitter junction of transistor 340 and enabling the emitter follower 350 of the comb filter 10 to coupled comb filtered output signals to the processor 12. At the same time diode 320 rectifies the input signal at terminal 34 and thus generates a self-bias voltage which reverse biases diode 320 and thereby provides additional attenuation of the signal at terminal 34 in addition to the attenuation provided by the reverse biased emitter follower transistor 340.

What is claimed is:

1. A color television receiver, comprising:
   a comb filter having luminance and chrominance output coupled to respective inputs of a display processor;
   a signal source for providing a composite video input signal having combined luminance and chrominance components and for providing a non-composite video input signal having separated luminance and chrominance components; and
   circuit means having a first operating mode for coupling said composite video signal to said input of said comb filter for display by said display processor and having a second operating mode for coupling said luminance component of said non-composite video signal to said input of said comb filter and for concurrently coupling said chrominance component of said non-composite video signal to said chrominance output of said comb filter for display of said non-composite video signal by said display processor.

2. A color television receiver as recited in claim 1 wherein said circuit means comprises a switch having a first input for receiving said composite video input signal, having a second input for receiving said luminance component of said non-composite video input signal and having an output coupled via an amplifier to said input terminal of said comb filter.

3. A color television receiver as recited in claim 1 wherein said circuit means comprises first and second switches, said first switch for selectively coupling said composite video signal and said luminance component of said non-composite video signal to said input of said comb filter, said second switch for selectively coupling said chrominance component of said non-composite video signal to said chrominance output of said comb filter.

4. A color television receiver as recited in claim 3 wherein each switch includes a respective output amplifier.

* * * * *